United States Patent Office 3,403,112
Patented Sept. 24, 1968

3,403,112
PROCESS FOR PRODUCING A MIXED OXIDE OXIDATION CATALYST HAVING IMPROVED SELECTIVITY
Morgan C. Sze, Garden City, N.Y., and Adolf W. Gessner, Montclair, N.J., assignors to The Lummus Company, New York, N.Y., a corporation of Delaware
No Drawing. Filed Aug. 20, 1965, Ser. No. 481,414
3 Claims. (Cl. 252—470)

ABSTRACT OF THE DISCLOSURE

A process for producing a mixed oxide oxidation catalyst of improved selectivity wherein a mixed oxide catalyst, such as iron molybdate, having a surface area above about 5.5 m.$^2$/gm. is heated to a temperature above 940° F. and the heating continued until the surface area is between 2.0 and 5.5 m.$^2$/gm.

This invention relates to a process for preparing oxidation catalysts and, more particularly relates to the production of oxide catalysts for converting alcohols to aldehydes, particularly methanol to formaldehyde.

For some years, ferric oxide-molybdenum trioxide catalysts have been known to be useful in the oxidation of methanol to formaldehyde. Such catalysts have been formed by a variety of processes, primarily by double decomposition of a water-soluble salt of a ferric halide and a water-soluble molybdate to precipitate from aqueous solution an iron molybdate which is washed and dried. While the iron molybdate catalysts are effective for the production of formaldehyde in substantial yield, they suffer from several shortcomings. Some, for example, lack the desired high selectivity such that appreciable amounts of other oxidation products—including carbon monoxide are formed.

In copending application Ser. No. 411,614, filed Nov. 16, 1964, an improved process is disclosed for preparing oxidation catalysts characterized by high physical strength, reasonably excellent selectivity and substantial catalyst life. With such catalyst high methanol conversions were obtained at relatively low temperatures, however, with an excessive amount of carbon monoxide formed at the expense of formaldehyde yield.

An object of the present invention is to provide an improved method for preparing oxidation catalysts of improved selectivity.

Another object of the invention is to provide a process for preparing mixed oxide, oxidation catalysts effective in the conversion of an alcohol to an aldehyde.

Still another object of the invention is to provide a process for forming catalysts advantageous in the conversion of methyl alcohol to formaldehyde.

A further object of the present invention is to provide an improved process for preparing oxidation catalysts for the conversion of methanol to formaldehyde where higher conversion of methanol are obtained with reduced formation of carbon monoxide. Other objects and advantages of the invention will be apparent from the following description.

We have found that higher conversion of methanol and improved yields of formaldehyde are attainable with oxidation catalyst of the type described in the copending application when the surface area of the catalyst is between about 2.0 to about 5.5 m.$^2$/gm. While the activity of the catalyst having such a surface area is not as great as a catalyst having a higher surface area, nevertheless the content of carbon monoxide in the reactor effluent is substantially less. Consequently, we are able to obtain methanol conversions of up to 99% with formaldehyde yields of up to 94%.

However, for reasons not clearly understood, catalysts prepared under apparently identical conditions sometimes may end up with surface areas greater than 5.5 m.$^2$/gm. and such catalysts will exhibit lower selectivity. In such instances, we have found that by a proper heat treatment of the prepared catalyst in accordance with the procedure as hereinafter described, the surface area of the catalyst may be controlled to within the 2.0 to 5.5 m.$^2$/gm. limits and a superior catalyst with higher selectivity results.

With respect to the preparation of the catalyst having the desired surface area without need for heat treatment, it is believed to be dependent upon the rate of precipitation of the catalytic material, the pH of the solution during precipitation, and mechanical working of the precipitate. We have found that if the rate of addition of ferric chloride is too fast, the resulting iron molybdate catalyst will have a high surface area of from about 5. to 8.0 m.$^2$/gm. or greater. As set forth in the copending application, the rate of addition was of from about 1 to about 5 liters/minute so as to obtain an easily filterable precipitate which permits the formation of a catalyst of suitable physical strength. While mechanical working tends to lower the surface area of the finished catalyst, the actual mechanism of how this factor effects the surface area of the catalyst is not well understood.

In accordance with one embodiment of the present invention, a mixed oxide catalyst active for the oxidation of an alcohol to an aldehyde is prepared by a process which comprises:

(a) Adding an aqueous solution of a water-soluble metal (1) selected from the group consisting of iron and cobalt and having a pH between about 0.8 and about 1.5 at a rate of less than about 1.5 liters/minute to an aqueous solution of a water-soluble salt whose anion contains a metal (2) selected from the group consisting of molybdenum and tungsten, whereupon a mixture of oxides of metals (1) and (2) is formed and precipitates from the resulting reaction mixture;

(b) Separating the precipitate from said reaction mixture and washing the precipitate;

(c) Reducing the water content of the precipitate to between about 50 to about 62 percent by weight;

(d) Mechanically working the precipitate;

(e) Reducing the water content of the precipitate until the water content thereof is from about 0.5 to about 1.5 percent by weight;

(f) Comminuting the precipitate from (e); and (g) Calcining comminuted material from (f) at a temperature of from about 600° F. to about 900° F. for from about 24 to about 72 hours until the resulting catalyst is substantially anhydrous.

In the preparation of the preferred iron molybdate catalysts of this invention, the process comprises:

(a) Adding an aqueous ferric iron solution having a pH between 0.8 and 1.5 at a rate of less than about 1.5 liters/minute to an aqueous solution of a soluble molybdate having a pH above 5.0 and up to; about 5.3, whereupon an iron molybdate is formed and precipitates from the resulting reaction mixture;

(b) Filtering the precipitate from said reaction mixture and washing the precipitate;

(c) Removing water from the precipitate until its water content is between 55 and 62 percent by weight;

(d) Mechanically working the precipitate;

(e) Drying the kneaded precipitate for about seven days as progressively increasing temperature starting at about 70° F. and concluding at about 280° F. until the moisture content thereof is about 1.5 percent by weight;

(f) Comminuting the precipitate from (e) and recovering material having a particle size passing through −4 to +10 mesh; and (g) Calcining the −4 to +10 mesh material from (f) at a temperature from about 700° F. to about 850° F. for about 48 hours until the resulting catalyst is substantially anhydrous.

In the other embodiment of the invention, a catalyst having a surface area greater than 5.5 m.$^2$/gm. may be subjected to a heat treatment to form a catalyst having a surface area between about 2.0 to about 5.5 m.$^2$/gm. The heat treatment is performed by subjecting the catalyst to a temperature of at least about 940° F., preferably of from 975° F., for a period of time ranging between about 1 to 24 hours. Generally, at the higher temperatures, shorter time periods are required whereas at lower temperatures longer periods are required.

The invention is described in detail hereinbelow in terms of the preparation of preferred iron molybdate catalysts, however, it is to be understood, as indicated later, that other mixed oxide catalysts are also contemplated herein.

In the formation of an iron molybdate, an aqueous solution of a water-soluble metal salt of iron is used; preferred is ferric chloride. Other iron salts such as bromides, nitrates, sulfates, acetates, oxalates and the like are suitable. Concentration of iron salt in the solution should be from about 1 to about 5 percent by weight, preferably about 1.2 percent. An important feature is that the pH of the iron solution should be of the approximate range of 0.8 to 1.5, preferably 1.0 to 1.4. The pH of the solution can be adjusted by adding thereto a strong acid such as a halogen acid. Hydrochloric acid is advantageous in this regard. The temperature is maintained at about 70–100° F. during the formation of the iron molybdate.

A water-soluble molybdate salt is used in forming the iron molybdate catalysts. Typical of such salts are ammonium, potassium and sodium molybdate. Preferred herein is ammonium heptamolybdate. Here, too, concentration is of importance and should be of the order of about 5 to about 10 percent by weight, advantageously about 6.5 percent. A salient feature of the process is the pH range of the aqueous molybdate solution; this is greater than 5.0 and less than 5.5, preferably about 5.3.

The aqueous solution of ferric chloride, adjusted to suitable pH value with HCl, is added at a rate of less than about 1.5 liters/minute to the aqueous solution of ammonium heptamolybdate, with vigorous stirring of the latter solution and of the resulting action mixture. While it is important to control carefully the rate at which the ferric chloride solution is added, it has been found that practically this is not always possible. The scale of catalyst preparation as well as other operations in the procedure, such as the kneading and the calcining at steps also affect the final catalyst surface area. Thus, sometimes for reasons not well understood, a catalyst prepared under carefully controlled and apparently identical conditions as another may have a surface area of greater than 5.5 m.$^2$/gm., or from about 6.0 to 8.0 m.$^2$/gm. or greater.

It has also been found that a ferric chloride solution and strong HCl can be added individually and simultaneously to the ammonium heptamolybdate solution, for the formation of desired catalysts, however, it is necessary to maintain the rate of addition specified above.

The weight ratio of Fe/Mo, in the iron molybdate precipitate should be from about 1:4.0 to about 1:6.1, and preferably about 1:5.

Following formation of the iron molybdate precipitate, it is filtered from the reaction mixture. The precipitate is then washed with water to remove any soluble salts. Generally, it is recommended that it be washed until the pH of the clear supernatant liquid is about 2.9 to 3.0.

Water is then removed from the precipitate, which contains up to about 80 percent by weight thereof, to provide a mass having a water content in the approximate range of 55 to 62 percent by weight, and preferably 55 to 58 percent by weight. Water can be removed from the precipitate by settling and partial drying. Water can also be removed by using a centrifuge and by partial drying. When the water content of the precipitate is above about 60 percent by weight, particularly above about 62 percent by weight, the subsequent kneading operation has been found to be ineffective with the result that the final catalyst composition has poor physical strength. And, when the water content of the precipitate is below about 55 percent by weight, particularly below about 50 percent by weight, kneading is very difficult.

As indicated, when the precipitate is of the proper water content recited above, it is then kneaded. This can be accomplished with a sigma-arm kneader, such as one manufactured by Baker-Perkins. The kneading action serves to provide a homogeneous mass, and to compact the filter cake. Generally, the kneading operation is conducted for from about 15 to about 120 minutes. Kneading of the precipitate cooperates with one or more of the other steps of the process to provide desired catalysts of high selectivity and physical strength.

The kneaded precipitate is now dried to a water content ranging from about 0.5 to about 1.5 percent by weight. Again, control is exercised in that drying is conducted over a period of from 5 to 7 days with an initial temperature of about 70° F. and at a final temperature of up to 325° F., preferably 70 to 280° F. Initially, drying is at a sufficiently slow rate that the formation of cracks in the filter cake as it shrinks is minimized. A suitable initial drying rate is from about 0.1 gram/hour/square centimeter of exposed surface, to virtually zero toward the end of the drying cycle. Drying can be carried out in an oven or in a dryer with heated air passed over the kneaded mass.

The dried precipitate is then comminuted to fine particle size, as by crushing or grinding in suitable equipment. The resulting comminuted particles are then passed through a screen or screens having a mesh size (U.S. standard) of from −3 to +12, preferably −4 to +10.

Comminuted particles of suitable size are calcined at a temperature within the range of about 600° F. to 900° F., preferably 700° F. to 850° F., for an interval of from 24 to 72 hours, preferably about 48 hours. The calcined product is substantially anhydrous, containing from 0 to about 0.5 percent by weight of water. The surface area of the catalyst will be between about 4.0 to 8.0 m.$^2$/gm. The catalyst is suitable for transportation and storage with little or no formation of fines.

A catalyst having the desired surface area of from 2.0 to about 5.5 m.$^2$/gm. may be obtained from a catalyst prepared as described above, by subjecting such a catalyst after calcining to a heat treatment. Accordingly, such a catalyst is heated to a temperature of at least 940° F., preferably 975° F. to 1200° F. for a period of time of from 1 to 24 hours. The resulting catalyst will have a surface area within the desired range of from 2.0 to about 5.5 m.$^2$/gm. The heat treatment may be carried out as part of the preparation of the catalyst or may be performed in situ after introduction of the catalyst into the oxidation reactor.

The following Examples 1 and 2 are provided to illustrate one embodiment of the invention. Examples 3 and 4 are provided to illustrate heat treatment of a catalyst to obtain a catalyst having a surface area between about 2.0 to about 5.5 m.$^2$/gm. The examples are not intended to limit the generally broad scope of the invention.

EXAMPLE 1

A 1.2 weight percent aqueous solution of FeCl$_3$ acidified with strong HCl to a pH of 0.8 to 1.0, was added at a rate of 0.5 liter/minute to a 6.4 weight percent aqueous solution of ammonium heptamolybdate with vigorous stirring, and the ratio of Mo to Fe was 5:1 by weight. The resulting precipitate was washed and filtered. The filter cake was compacted by pressure filtration until the moisture content was 55-58 percent by weight, and subsequently kneaded in a sigma-arm kneader. The kneaded material was dried for one week to a progressively increasing temperature ranging from room temperature to 280° F. After one week's drying, the moisture content of the material was 1.5 percent. This material was crushed and screened, and the −4 to +10 mesh material was calcined at 750° to 850° F. for two days. The catalyst was found to have a surface area of 6.8 m.$^2$/gm.

EXAMPLE 2

A catalyst was prepared as described in Example 1, except that in the precipitation step, aqueous FeCl$_3$ solution and strong hydrochloric acid were added to the aqueous ammonium heptamolybdate solution simultaneously from two separate sources at a rate of 5 liters/minute. The catalyst was found to have a surface area of 6.8 m.$^2$/gm.

EXAMPLE 3

An iron molybdate catalyst having a surface area of 8.6 m.$^2$/gm. was heated to a temperature of between 940° to 975° F. for a period of 16 hours. After the heat treatment, the catalyst was found to have a surface area of 3.4 m.$^2$/gm.

EXAMPLE 4

The catalyst of Example 3 was heated to a temperature of between 975° and 1020° F. for a period of 24 hours. The surface area of the catalyst after heat treatment was found to be 2.7 m.$^2$/gm.

Table I, below illustrates the relationships between the surface area of the catalyst and formaldehyde yields at 95% methanol conversion together with the carbon monoxide content in the reactor effluent. The reaction system was essentially the same for each test. The iron molybdate catalyst to be tested was placed in a ¾" 16BWG tube and a stream of air containing 8.5 to 9.5 volume percent methanol at a temperature of 520° F. was passed over the catalyst bed at a space velocity of from 7000 to 8000 ft.$^3$/ft.$^3$/hour. To further illustrate the invention and the effect of the surface area, catalyst sample E was prepared by heat treating catalyst sample D as a temperature of 1200° F. for three hours.

TABLE I

| Catalyst sample | Surface area, m.$^2$/gm. | Formaldehyde yields, percent | CO in effluent, vol. percent |
|---|---|---|---|
| A | 4.6 | 90.5 | 0.4 |
| B | 6.0 | 88 | 0.6 |
| C | 4.6 | 91 | 0.4 |
| D | 5.9 | 88 | 0.6 |
| E | 2.2 | 91 | 0.4 |

From the foregoing it may readily be seen that higher formaldehyde yields are obtained with lower carbon monoxide content in the effluent gas when the catalyst has a surface area between about 2.0 and 5.5 m.$^2$/gm.

Although the invention has been illustrated in detail in terms of the preparation of iron molybdate catalysts, it is to be understood that other oxidation catalysts can be formed by resorting to the instant process. Mixed oxide catalysts can be formed from water-soluble metal salts of cobalt in place of, or together with, similar salts of iron, and water-soluble metal salts of tungsten in place of, or together with, similar salts of molybdenum.

In the event that an oxidation catalyst prepared in accordance with the formulating steps set forth hereinabove notwithstanding addition of one of the reagent solutions to the other at a rate less than about 1.5 liters/minute, results in a catalyst having a surface area above about 5.5 m.$^2$/gm., the catalyst can be subjected to the heat treatment (i.e., alternate embodiment of the invention) to obtain a catalyst having a surface area of between about 2.0 to about 5.5 m.$^2$/gm.

The language "iron molybdate" has been used herein in a generally descriptive sense, since the precise composition of the precipitate formed from ferric chloride and ammonium heptamolybdate, and the composition of the ultimate catalyst formed therefrom, are not known. Thus, the catalyst are broadly defined as mixed oxides, typical of which is one comprised of iron oxide or oxides and molybdenum oxide or oxides.

As shown, the catalysts of this invention are advantageous for oxidizing methanol to formaldehyde. They can also be used for corresponding oxidation of ethanol and higher alcohols to aldehydes. The catalysts can be used by themselves—i.e., in unsupported form—and can also be used when supported on a suitable material such as carborundum.

Obviously many modifications and variations of the invention as set forth above may be made without departing from the spirit and scope thereof; consequently, the appended claims are intended to include such modifications and variations.

What is claimed is:
1. A method for producing an iron molybdate oxidation catalyst having improved selectivity which comprises heating an iron molybdate catalyst having a surface area greater than 5.5 m.$^2$/gm. to a temperature above about 940° F. and continuing said heating until the surface area of the catalyst is between about 2.0 and about 5.5 m.$^2$/gm.

2. The method as defined in claim 1 wherein a temperature of between about 975° to about 1200° F. is maintained during the heat treatment.

3. The method as defined in claim 1 wherein heat treatment is performed for a period of time of from 1 to 24 hours.

References Cited

FOREIGN PATENTS 938,648 10/1963 Great Britain.
1,310,499 10/1962 France.

DANIEL E. WYMAN, *Primary Examiner.*

P. E. KONOPKA, *Assistant Examiner.*